(12) United States Patent
Wicker et al.

(10) Patent No.: US 6,404,750 B1
(45) Date of Patent: Jun. 11, 2002

(54) SENSOR-ASSISTED ALOHA FOR WIRELESS NETWORKS

(75) Inventors: Stephen B. Wicker; Terrence L. Fine, both of Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/133,609

(22) Filed: Aug. 13, 1998

(51) Int. Cl.[7] ................................................ H04Q 7/00
(52) U.S. Cl. ....................... 370/329; 370/462; 455/456; 706/15; 706/40
(58) Field of Search ................................ 370/328, 329, 370/330, 336, 337, 442, 458, 462; 455/422, 456, 457; 706/15, 16, 17, 21, 25, 40, 41

(56) References Cited

U.S. PATENT DOCUMENTS

| | | | | |
|---|---|---|---|---|
| 5,103,445 A | * | 4/1992 | Ostlund | 370/329 |
| 5,293,642 A | * | 3/1994 | Lo | 455/456 |
| 5,722,044 A | * | 2/1998 | Padovani et al. | 455/443 |
| 5,729,542 A | * | 3/1998 | Dupont | 370/346 |
| 5,867,813 A | * | 2/1999 | Di Pietro et al. | 704/202 |
| 6,038,455 A | * | 3/2000 | Gardner et al. | 455/447 |
| 6,097,956 A | * | 8/2000 | Veeravalli et al. | 455/446 |

* cited by examiner

Primary Examiner—David Vincent
Assistant Examiner—Bob A. Phunkulh
(74) Attorney, Agent, or Firm—Perkins, Smith & Cohen, LLP; Jacob N. Erlich; Jerry Cohen

(57) ABSTRACT

The invention is made of an apparatus which incorporates a sensor-based means for stabilizing random access networks. In the preferred embodiment, a grid of sensors is used to gather energy measurements for analysis. In a preferred embodiment a neural network has been trained to estimate the number of colliding users in a given slot. This information is used to set parameters in a backoff algorithm so as to stabilize the network and minimize the delay experienced by users. The invention has the ability to locate users geographically within the network coverage area. This information can be used in conjunction with a steerable beam or an array of antennas to develop geographically-determined Aloha subchannels, further increasing the capacity of the system.

22 Claims, 5 Drawing Sheets

| Conditional Probability | True Number of Callers C | | | | |
|---|---|---|---|---|---|
| | 1 | 2 | 3 | 4 | 5 |
| P(1\|C) | 1 | .038 | 0 | 0 | 0 |
| P(2\|C) | 1 | .938 | .022 | 0 | 0 |
| P(3\|C) | 0 | .024 | .952 | .044 | 0 |
| P(4\|C) | 0 | 0 | .026 | .904 | .03 |
| P(5\|C) | 0 | 0 | 0 | .052 | .97 |

TABLE 1

FIG. 5

SENSOR-ASSISTED ALOHA FOR WIRELESS NETWORKS

FIELD OF THE INVENTION

The present invention relates generally to wireless communication systems. More particularly, the present invention relates to stabilizing a network to minimize delays experienced by users when trying to access the network.

BACKGROUND OF THE INVENTION

In wireless communication systems, the electromagnetic spectrum that comprises the channels available to a network operator is a precious commodity. In most systems the number of subscribers far exceeds the number of available channels, thus means for providing network resources on demand must be provided. In digital cellular telephone systems this "random access" problem is solved by means of slotted Aloha. Aloha is a well-known term of art defining "handshaking" or allotting and acknowledging a communications connection path. In the unslotted and slotted Aloha protocols, users transmit on a common channel. If two or more users transmit at substantially the same time, they are said to "collide"—in many cases this means that neither user is successful in getting through to the network. In slotted ALOHA, the users are constrained to transmit in time slots, thus user transmissions completely overlap and collide or do not overlap at all. In unslotted ALOHA, a user transmits whenever he or she wishes and there is a time window during which a transmission by another user causes a collision. The colliding users must retransmit at later, randomly selected, times to reduce the risk of further collisions. It is important to note that the retransmission timing must be random to reduce the risk of further collisions. Users that have suffered a collision and are waiting to retransmit are said to be "backlogged" users.

In digital cellular systems, a separate Aloha channel is provided for registration and channel access. Registration is the process by which a mobile informs a base station of the mobile's presence and ability to place and receive calls. FIG. 1 of the drawings shows a known, prior art simplified protocol for channel access and voice/data wireless transmission. "Forward" transmissions are defined as those between the Base Station Controller (BSC) and the mobile user. "Reverse" transmissions are those from the mobile to the BSC. Forward and reverse transmissions may use distinct frequencies (frequency division duplexed—FDD). Forward and reverse transmissions may also be on the same channel (time division duplexed—TΔΔ). In the example in FIG. 1, however, both the forward and reverse channels are time division multiplexed to accommodate multiple users (time division multiple access—TDMA). An Aloha segment is included on the reverse channel to allow for user registration and requests for access.

FIG. 1 also shows the timing of a simple request for reverse channel time. The mobile user sends a request to set up a call on the Aloha portion of the reverse channel. The network responds with a grant of access on the forward channel. This grant of access allocates a particular pair of channels to the mobile user over which the call can proceed. Aloha protocols thus provide a simple and cost effective means for controlling access to the network resources.

It is therefore an object of the present invention to stabilize slotted Aloha by managing channel loading.

It is another object of the present invention to provide a simple technique for determining the number of backlogged users.

It is yet another object of the present invention to provide and set parameters for a backoff algorithm to accommodate colliding callers.

SUMMARY OF THE INVENTION

The present invention meets the foregoing objects in systems and methods for designing a system to control the probability $q_r$ with which backlogged users retransmit. Advantage is made of the fact that if the number of backlogged users is known, the retransmission probability can be varied appropriately. The present invention provides a technique for determining the number of backlogged users which is used to set parameters to a backoff algorithm to better service and accommodate colliding callers.

In this invention a collection of sensors is used to collect energy measurements throughout the network coverage area. The sensor data is processed by an artificial neural network that has been trained to determine the numbers of colliding users, and also to determine whether a given transmitter (successful or not) was a member of an earlier group of colliding callers. This information is used to track the number of backlogged users, and to set the parameters of the backoff algorithm accordingly.

The sensor information can also be used to improve performance in those cases in which the number of active users exceeds the capacity of the channel. The sensors provide azimuthal information that is used to partition the Aloha channel into a number of subchannels whose collective capacity is sufficient to resolve contention among the backlogged users. The basic idea of the present invention is to use the sensors to determine the angle from which the transmissions are arriving at the base station. This allows the use of steerable beam antennas to separate colliding users that do not lie along the radial line moving out from the base station. This sectorization of the Aloha channel spatially resolves a large group of callers into smaller clusters of callers that can then be allowed access to the network in time through the backoff algorithm, thus achieving a higher throughput than that possible with a single Aloha channel.

Other objects, features and advantages will be apparent from the following detailed description of preferred embodiments thereof taken in conjunction with the accompanying drawings in which:

BRIEF DESCRIPTION OF THE DRAWINGS

FIG. 5 is a table of conditional probabilities for determining the number of callers;

DETAILED DESCRIPTION OF PREFERRED EMBODIMENTS

In order to better understand the present invention it is desirable to understand the applications of wireless networks where the invention can be utilized to advantage.

Figure 1:
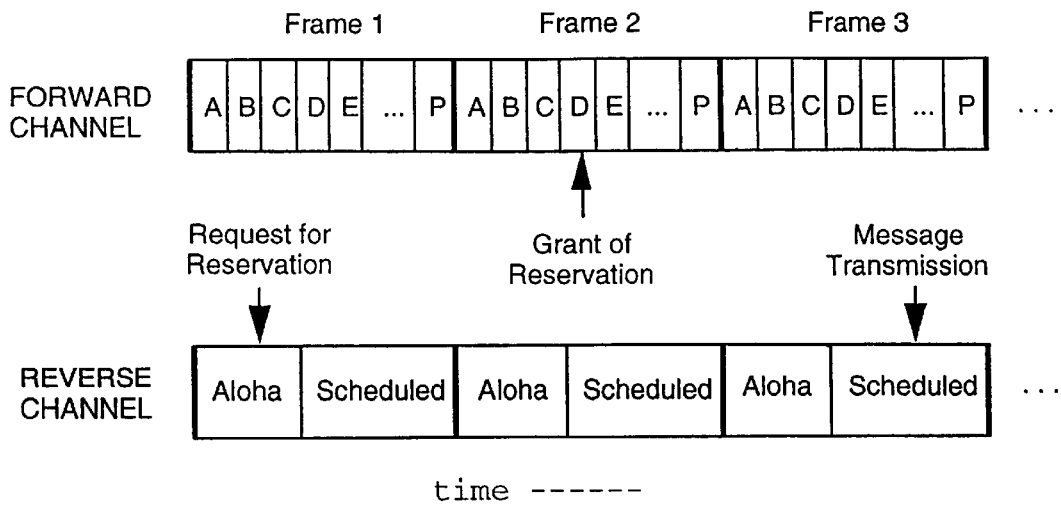
FIG. 1 is a block diagram of prior art frames organized versus time for channel access and voice/data transmission (FDD/TDMA)
Figure 2:
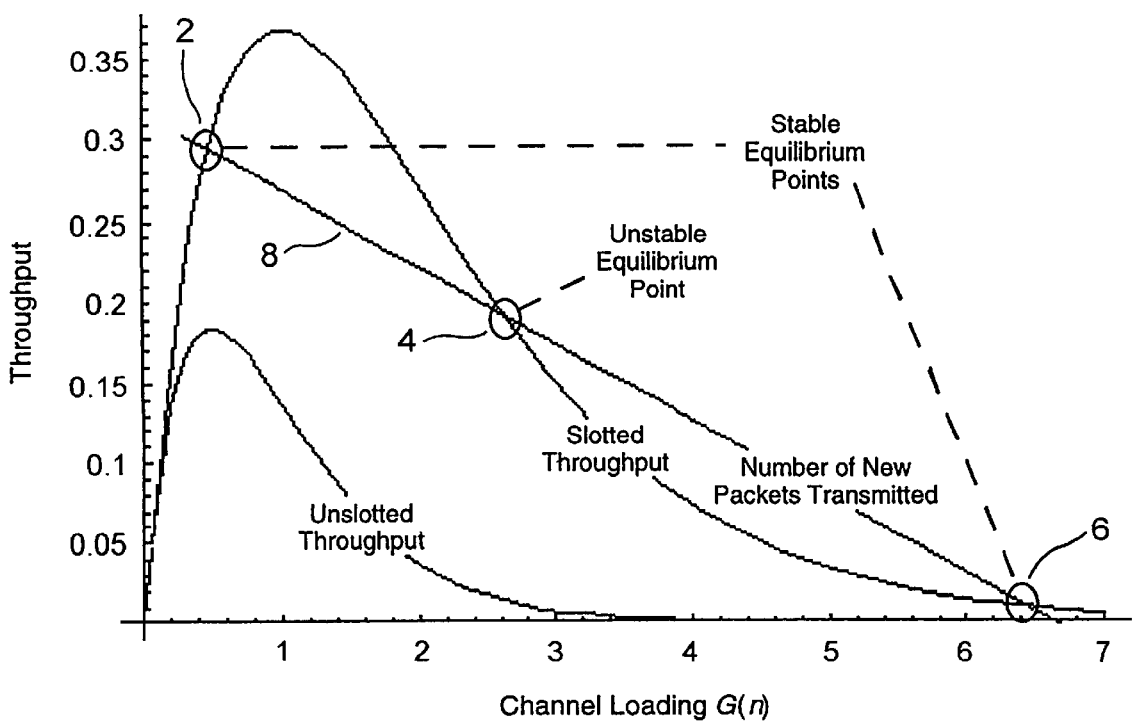
FIG. 2 is a graph of unslotted and slotted Aloha Dynamic Performance Curves.

FIG. 2 shows a stability curve for a typical slotted Aloha protocol. This curve shows how throughput in the Aloha protocol varies with channel loading G(n). G(n) is the expected number of new and retransmitting users that will request access in a given slot. "Throughput" is defined to be the probability that some user, either new or backlogged, succeeds in transmitting successfully in a randomly selected slot. "Drift" is defined to be the expected change per slot in the number of backlogged users. Drift is a function of the retransmission probability per slot $q_r$ for backlogged users, the probability $q_a$ that a randomly selected idle user will become active in the next slot, the number n of currently backlogged users, and the total number m of users in the population. Specifically:

$$\text{drift} = (m-n)q_a - (1-q_r)^n(m-n)(1-q_a)^{m-n-1}q_a - n(1-q_r)^{n-1}q_r(1-q_a)^{m} \quad (1)$$

Using the bursty traffic assumption that $q_a \ll 1$, we replace $(1-q_a)$ by $e^{-q_a}$ and $e^{q_a}$ by 1. Letting $S=(m-n)q_a$, we then obtain $$\text{drift} \approx S - (1-q_r)^n S e^{-S} - n q_r (1-q_r)^{n-1} e^{-S} := d(n,S) \quad (2)$$

The curve shown in FIG. 2 is the contour for zero drift, d(n,S)=0, plotted as a function of n on the horizontal access and S on the vertical axis. Above this contour, d(n,S)>0, and below the contour, d(n,S)<0. For medium-to-heavily loaded situations, this zero-drift contour is intersected in three points 2, 4, and 6 by the new user load line 8. $S=(m-n)q_a$, a straight line of negative slope passing through (n=0, S=$mq_a$) and (n=m, S=0) that represents the expected number of new users who will attempt to transmit in a given slot. Whenever the number n of backlogged users is such that the new user load line is below the zero-drift contour, then on average, backlogged users are able to transmit successfully, in which case n tends to decrease with time. This, in turn, causes the short-term throughput to decrease and the new user loading to increase until an equilibrium point is approached where the zero-drift curve and the new user load line intersect. Conversely, whenever n is such that the new user load line is above the zero-drift contour, n tends to increase as new users collide with one another and with backlogged users until the nearest equilibrium point is approached. The three equilibrium points in FIG. 2 are thus labeled stable or unstable, according to the direction of drift resulting from slight displacements therefrom.

More specifically, the present invention deploys a field of small clusters of inexpensive isotropic energy-measuring sensors deployed in each cell throughout the network coverage area. A cell is a section of the geographic region covered by the wireless network. The purpose of the division into cells is to make the most use out of a limited number of available channels. The sensors in a cluster are tuned to the reverse random access and scheduled channels. The sensors in a cell are connected to a low-bandwidth network that allows for the transmission of sensor data to a single processing site at or near the BSC where the signals are processed by the neural network. Depending on the multiple access scheme employed and the reverse channel structure, the random access and traffic channels may vary in frequency, time slots, spreading code, or all of the above. A single sensor can cover the entire reverse channel spectrum. On the other extreme, a cluster can contain a single sensor for every sub-channel of interest.

The sensors lying within a cell report to the local BSC, while sensors at a boundary region between two cells might report to both associated BSC's. The sensors are located in the cell so that they can be readily linked to the base station and so that several sensors will respond strongly to each mobile within the cell.

The sensors report total received signal energy, measured over a time period "$\tau$", on the reverse random access channels. In the case of the random access channels the time period "$\tau$" is on the order of the mean packet length (time) in unslotted (pure) Aloha or a slot length (time) in slotted Aloha. In essence, "$\tau$" determines the time length of the retransmission window in the event of collisions between mobiles seeking access. The random access channel signal initiated by mobile $m_j$, and received at sensor $s_i$, is given by the complex-valued signal $c_{i,j}(t)$ and is determined by the typically difficult to describe accurately propagation characteristics from the mobile location to the sensor location. In the present invention, a series of propagation measurements are made by moving multiple transmitters across the cell in place of inaccurate analytical modeling of this propagation. The total signal received by the i-th sensor from all f mobiles seeking access is $$C_i(t) = \sum_{i=1}^{f} C_{i,j}(t) \quad (3)$$

As the sensor need only respond to energy measured over a time period $\tau$, equal to the slot-length in slotted Aloha or mean packet length in unslotted Aloha and reported at sampling times $\{t_k\}$, that are multiples of $\tau$, this energy reported by the i-th sensor is given by $$e_i(t) = \int_{t_k^{\tau}}^{\tau} |C_i(t)|^2 dt \quad (4)$$

Figure 3:
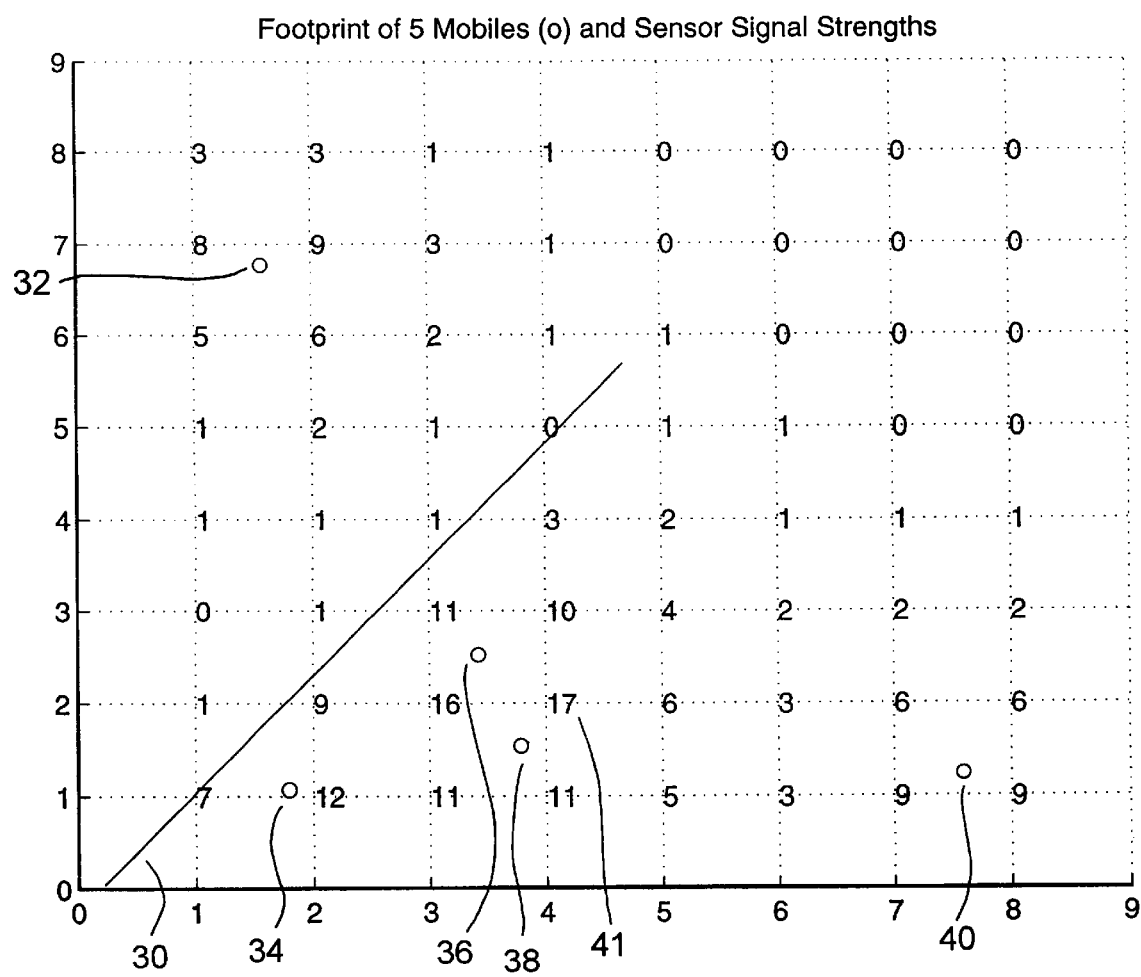
FIG. 3 is a layout of a sensor field and measurements of five transmitting users.

FIG. 3 shows the results of a simulation that was performed based upon a single rectangular area of cell coverage with a superimposed rectangular array of sensors (8×8 in this example). A propagation model was used with a settable exponent governing attenuation with distance (an exponent of 3), which corresponds to an attenuation proportional to the inverse of the cube of the distance between a mobile radiator and sensor or base station antenna and the presence of strongly absorbing objects. One strongly absorbing (10-db) object 30, such as a hill or a building, was presumed to be located in the cell area stretching diagonally from near the cell center to one corner. Multipath propagation characteristics can also be added by assuming that there are multiple distances between each point in the cell and each sensor that exceeds the straight-line distance between the point and sensor. Five (f≦5) mobiles 32, 34, 36, 38, 40 seeking access were randomly located in the cell, and repeated runs of the simulation were then performed with randomly varying mobile locations. The 64 sensors were placed at each coordinate (i,j), 1≦i,j≦8, and the quantized energy is marked at each sensor (e.g., item 41 shows that the energy level is 17 at sensor (4,2)).

When applied to a real system, a large number of the sensors described above would be distributed over the physical region that forms a particular mobile wireless communications system cell associated with a particular base station. For simplicity, a square cell with 49 or 64 evenly distributed sensors was assumed in the simulations. That is, the sensors were placed at lattice points within a uniformly-shaped cell. In practice, a variety of considerations such as the need to cover areas that might be otherwise shadowed, antenna placement, power availability, and communications access such as a telephone lines, would dictate the sensor cluster placements, and the sensors would be unlikely to be spaced as regularly as in the simulations. This departure from regularity is not a limiting factor in the performance of the present invention.

Propagation characteristics in urban and semi-urban areas are well-known to be rendered quite complicated by the presence of multiple absorbing, scattering, diffracting, and reflecting surfaces, e.g. buildings, trees, bridges, and cars. Existing analytical and ad hoc models for propagation behavior of short wavelength wireless signals were found to be unsuitable for multiple mobiles and multiple sensors. So, a simulation test bed was developed to model shadow fading and multipath characteristics in order to evaluate the present invention. The simulation aids in the understanding of the operation of the invention.

In the 8×8 sensor field array of FIG. 3, the numbers $\{e_{(i,j)}(t_k)\}$ attached to each lattice point of the form (i,j) correspond to the rounded off signal energy received by the sensor located at that point in the cell as measured over a particular short time interval of width $\tau$ ending at time $t_k$. The actual signal energies recorded depend upon the number of active mobiles and a variety of propagation modeling assumptions that include the exponent of the attenuation of signal strength with distance and the presence of absorbing and reflecting objects. Diffraction and scattering effects were not included in the simulation. The array of energies $\{e_{(i,j)}(t_k)\}$ is transmitted over the low-bandwidth communication links between the individual sensor clusters and the base station and is processed there after reordering as a p-dimensional vector $\{e_i\}$.

The signal energies $\{e_i(t_k), i=1, \ldots, p\}$ reported at the kth sampling time from the p random access channel sensors establish a footprint over the sensor array that is a composite of the signals received over the cell from all of the mobiles requesting access over the reverse control channel in the short time t preceding $t_k$. For a given number f of such mobiles, the observed high-dimensional footprint will vary enormously depending upon the random locations of the f mobiles within the cell. A goal of the present invention is to infer the number f of mobiles in the cell that are simultaneously seeking access.

Calculation of f analytically is rendered difficult by the irregular, partially known propagation patterns over the cell. In the invention, f at time $t_k$ is inferred on the basis of the p sensor responses by using $e_1, \ldots, e_p$ as a p-dimensional input or feature vector to an artificial neural network. This is a pattern classification or hypothesis testing problem in which the number of pattern classes or hypotheses is given by an upper bound $\bar{f} \geq f \geq 0$ to the number of colliding mobiles seeking access. The classes or hypotheses correspond to the possible number of simultaneously active mobiles and can be formulated as f taking integer values from 0 to $\bar{f}$. A last compound hypothesis can be added that says the number of active mobiles exceeds $\bar{f}$. $\bar{f}$ equals 5 in the simulation.

Figure 4:
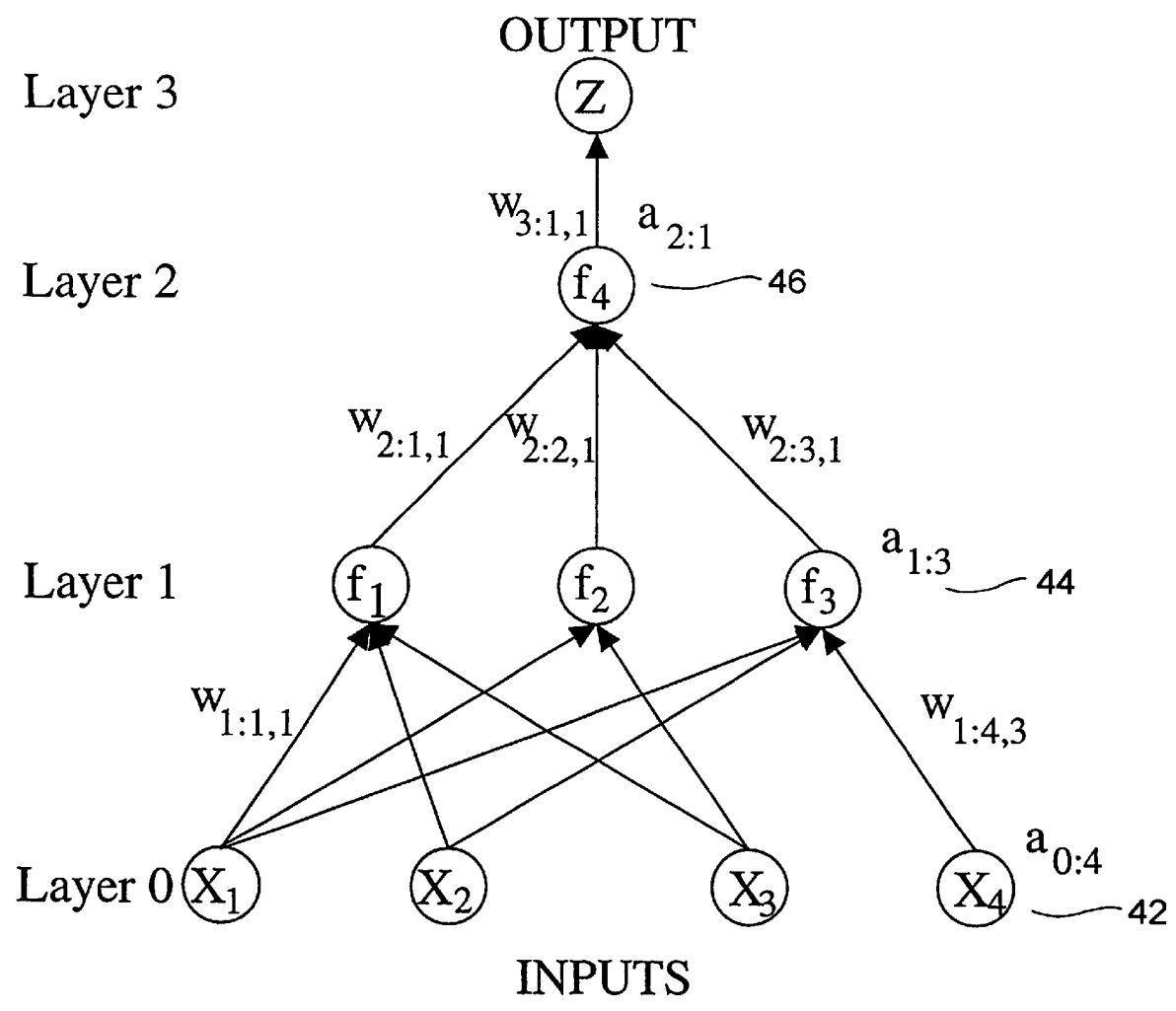
FIG. 4 is a diagram of a hidden layer network for estimating the number and location of colliding users.

In the preferred embodiment of the invention, actual cellular propagation characteristics are measured at the time that the sensors are initially placed. The measurement is accomplished by moving several mobile phones over the cell region and measuring the locations at which brief transmissions are made and the times at which they are made. This data on transmissions is then put together with the sensor field reports of energies measured at those time to form a training set for a neural network. An example of a neural network having few nodes than actually needed in an application such as the present invention is shown in FIG. 4.

The neural network is a computing system preferably located at the base station controller which receives and processes the reports from the sensor array within a cell. A function of the neural network is to convert the array of numbers received from the sensor clusters within a cell into estimates of the number of callers that have collided when requesting service. In FIG. 4, layer 0 (labeled 42) preserves the topology of the sensor locations from which calculations of local features (e.g., responses from clusters of neighboring sensors) may be performed. Subsequent layers 44, 46 combine these local feature responses to perform character (or pattern) recognition.

Alternatively, cellular propagation characteristics may be obtained by probing a cell by moving a single mobile unit over it, transmitting at known times, and recording at the sensor sites the complex-valued received signal $c_i(t)$ rather than the energy $e_i$, measured over the time of a mobile transmission. This is far more data than can be assumed to be communicated to the BSC. For purposes of generating training data, however, each sensor may be instrumented to make the recording. The instrumentation would not be part of the system after the initial training period. The data gained, however, would yield a training set of the type described above by randomly choosing f of the single mobile transmissions made at different locations, adding together the previously recorded complex-valued signals received at each sensor from each of the f transmissions, and then computing the energies $\{e_i\}$.

Both methods described above produce data which accurately represents the propagation characteristics of an actual cell. Hence, the training set, which will vary from cell to cell, will be tuned to the true physical characteristics of the cell and not be dependent upon problematic analytical models including the above-described test bed model.

The invention also uses the sensor energy reports $\{e_i\}$ to determine the identities of the access-seeking mobiles so as to determine whether a mobile is a new user or one of the backlogged users. Assume that a group having f mobiles seeking access have collided. Further assume that in the next time interval some mobile succeeds in gaining access. It follows that it must be determined if the successful mobile was a member of the previous group of backlogged users, in which case the remaining group size is (f-1), or whether the successful mobile was a new customer and that there is still a group of f backlogged mobiles. The sensor responses may be used to advantage to resolve this issue. In the relatively difficult case where f=5, it was found that subtracting the sensor responses (i.e. the footprint) for the single successful mobile from the previous sensor responses to the group of 5 mobiles provided a pattern of dimension p that could be processed simply by looking for a negative entry. This procedure resulted in a 2.5% error rate on a test set of size 3000.

Prior art work regarding neural networks models have provided the greatest success to date in dealing with high-dimensional nonlinear classification and estimation problems of the type resolved in the present invention. The origins, structures, and abilities of neural networks and methods for their design and validation are discussed in the prior art. Neural network extraction of information about numbers and locations of colliding callers, from sensor array data collected in the field, will require consideration of several architectures so to select the one that works best. Such architectures will include single output, single hidden-layer networks with, say, logistic nodes, single output, two hidden-layer networks, and the multiple output versions of such networks having $\bar{f}$ outputs. This latter configuration is commonly employed in other pattern classification applications. For example, see FUNDAMENTALS OF ARTIFICIAL NEURAL NETWORKS, by M. Hassoun, MIT press, 1995. Such neural networks have been used to advantage in communications applications for blind channel equalization and Viterbi decoding.

An appropriate network architecture to process the input data array given by the elements $\{e_{(i,j)}\}$ rearranged as a p-dimensional vector $\{e_k\}$. It might seem from the successes enjoyed by neural networks at optical character recognition that a network having multiple hidden layers with a wide first hidden layer that constructs a large number of local features should also be deployed. Local features are functions of several energy values as measured at clusters of nearby sensors. To simplify the huge network that results from such an approach, one often assumes translation or shift invariance: the processing that is desirable for one group of energy values, say $e_{(i1, j1)}, \ldots, e_{(i5, j5)}$ is also desirable for the translated group $e_{(h+i1, v+j1)}, \ldots, e_{(h+i5, v+j5)}$, where integers h, v denote a shift by h in the horizontal direction and by v in the vertical direction. As the cell structure is unlikely to be spatially homogeneous, the propagation characteristics will not themselves be translation or shift invariant. Therefore, closely following the model of optical character recognition is not a good choice. Experimentation with the simulation test bed revealed that six nodes in a single hidden-layer sufficed, although this number will have to be adjusted to deal effectively with the real data collected by probing the cell propagation characteristics, as described above.

Effective use of neural networks requires the appropriate encoding of desired target variables such as the number f of mobiles seeking access into the output of the network A discussion of the encoding of the network response follows. In pattern classification problems having $\bar{f}$ pattern classes (e.g. $\bar{f}$=10 in optical digit recognizers) it is common to have $\bar{f}$ network outputs. The i-th network output is trained to be 1 when the pattern presented is of class i and the remaining $\bar{f}$-1 outputs are trained to be 0. This leads to a cumbersome network requiring a large amount of data for successful training. Instead so-called thermometer encoding is used. This encoding yields single real-valued network output with the range of output values partitioned into $\bar{f}$ intervals. A network response falling in the i-th interval indicates an i-th pattern class. As indicated earlier, the interval containing the largest responses can also be interpreted as meaning that f is greater than or equal to $\bar{f}$.

The primary experimental simulation then used p=64 sensors, had up to 5 mobiles seeking simultaneous access, and generated a training set of 2,500 vectors of the true number f of mobiles and the 64 sensor energy reports $e_1, \ldots, e_{64}$. This data, an amount which could be easily generated by real propagation measurements in an actual cell, was then used to train the selected neural network have 397 parameters.

Training of the neural network used the method of quasi-Newton optimization together with regularization. Regularization was found to be valuable, for without it, large network weights were produced and this implied poor generalization ability. The performance of the resulting network was then evaluated by testing on an independently generated simulated data set that was also of size 2500. The results shown in the table of FIG. 5 for the conditional probability P(j|C) of the network deciding that there were j callers when in fact there were C callers seeking access. These conditional probabilities also provide the information required to optimize Aloha throughput as discussed above.

The spatio-numeric information about the number and location of contending users in the sensor-assisted wireless network allows the BSC to implement a variant of centrally controlled Aloha. In classical centrally controlled Aloha, it is assumed that the control center knows the exact number N(k) of backlogged users at the end of slot k; in the past this assumption has never been fully warranted in practice.

In the present inventive sensor-assisted Aloha, the BSC does not know N(k) exactly. However, it does receive accurate information about the following:

1. The intensity of each collision that occurs, including how many of the mobiles that collided are new arrivals and how many are retransmitting backlogged users;
2. Whether a successful transmission came from a new user or a backlogged user; and
3. The location of any users still backlogged at the end of any slot.

By tracking items (1) and (2) over successive slots, the BSC can develop an accurate estimate $\{N'(k)\}$ of the process $\{N(k)\}$ such that the BSC will be able to operate effectively as a central controller in the sense of ideal centrally controlled Aloha. Specifically, the BSC should be able to adjust $q_r$ as a function of N' in order to achieve stable operation in the Poisson limit $m \to \infty$, $q_a \to 0$, $mq_a \to \lambda$ for any $\lambda < e^{-1} = 0.368$ by broadcasting its estimate of the optimum retransmission probability, namely $$qr,opt=(1-\lambda)/(N'-\lambda), \qquad (5)$$

where N' is its best estimate of the current number of backlogged users.

Figure 6:
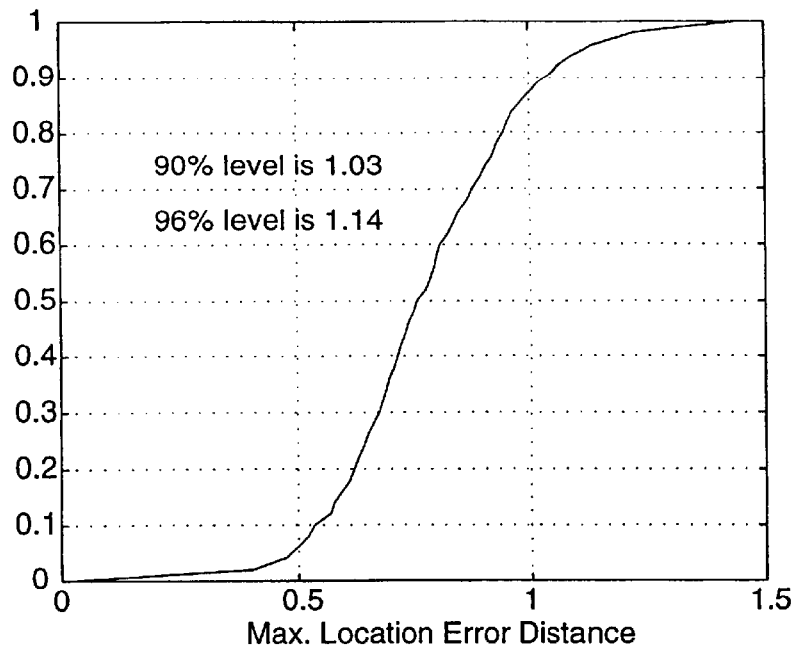
FIG. 6 is a graph of an empirical distribution of maximum location errors, [f=5] within the present invention.

An illustration of the ability of the sensor field to provide location information is provided in the empirical distribution shown in FIG. 6. For the simulation parameters, the performance of an ad hoc location algorithm in the difficult case of a maximum number (five) of colliding callers described above. In simultaneously estimating the locations of all five mobiles seeking access, the worst case distance between the true location of one of these mobiles and the estimate of its location was then evaluated with the result shown. For example, with probability 0.9 the worst case distance is no more than 1.03, or about the lattice spacing chosen for the sensor field. Hence, with probability at least 0.9, in this simulation setup, colliding callers can be located with an accuracy at least that of the sensor spacing.

The BSC will use the locations of the backlogged users at the end of a given slot order to decide when to divide the users into separately processed azimuthal clusters via adaptive beam formation. Specifically, this separation should be performed in such a way as to attempt to keep the offered new traffic $m_i q_a \approx \lambda_i$ in cluster i safely below $e^{-1}$ for all i, say $\lambda_i \leq 0.3$. The reason for this is that the expected delay required to resolve collisions diverges to infinity as $\lambda \to e^{-1}$; thus, even though all throughputs less than $e^{-1}$ can be handled in a stable fashion, the delays become intolerable in practice once $e^{-1}$ is approached sufficiently closely. Three properly managed clusters should be able in this manner to produce an overall throughput of 3(0.3)=0.9 successful reservations per slot time, with the requisite adaptive antenna diversity described above and with known parallel processing is built into BSC.

Figure 7:
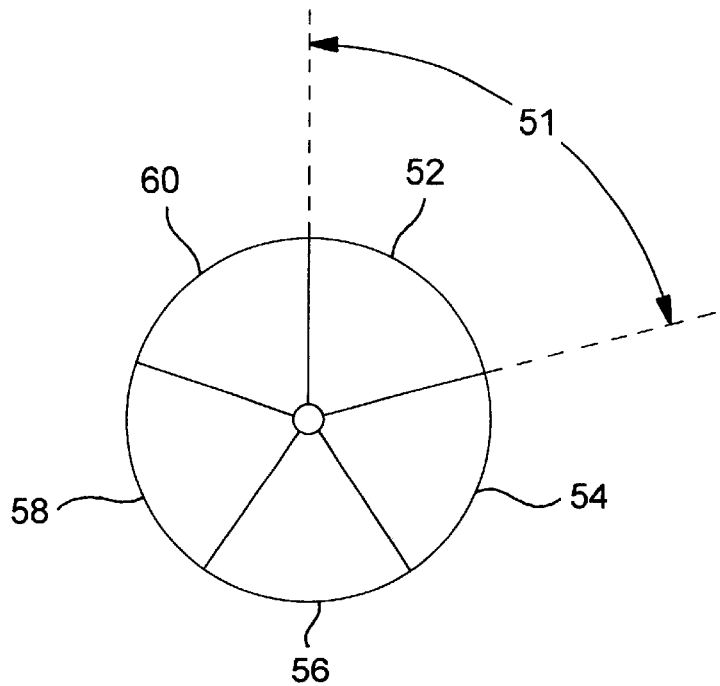
FIG. 7 is a topographical view of a sectored antenna array.

FIG. 7 is a topographical view of an array of five antennas 52, 54, 56, 58 and 60 that allow sectoring through azimuthal location of peak-load callers which can be used to advantage to improve Aloha throughput even with optimal use of a probabilistic error model for the sensor-based neural network estimator. The five antennas are shown that divide the areas into 72 degree fields, for example S1 for antenna 52. Alternatively, a steerable antenna (not shown) could be used. Peak loadings in which uncommonly large numbers of mobiles seek access are unlikely to be accommodated. The sensor field/neural network estimator of the present invention, however, enables callers to be located in azimuth and thereby allows colliding callers to be clustered in sectors to form more manageable groups. In order to implement this clustering, a base station is fitted with the sectoring array or steerable antennas directed to form a beam so as to partition the colliding callers into these more manageable groups. In effect, spatial separation is used to assist the Aloha backoff algorithm in its attempt to temporally separate users by reducing the number of backlogged users to those within a given beam.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A system for stabilizing a random access protocol within a cell of a wireless communications network comprising:
    a field of energy measuring sensors for providing data, said sensors distributed substantially within the cell;
    means for receiving said data from the energy measuring sensors;
    means for determining from said data a number of overlapping users seeking access to the wireless communications network; and
    means for reducing the delay time before the users obtain access to the wireless communications network in response to the determination of the number of overlapping users.

2. The system as defined in claim 1 wherein said means for reducing the delay time comprises a random access protocol slotted Aloha.

3. The system as defined in claim 1 wherein said means for reducing the delay time comprises means for varying a retransmission delay time in proportion to the number of overlapping users seeking access.

4. The system as defined in claim 1 wherein said means for determining the number of overlapping users seeking access comprises means for neural net processing of said data.

5. A system for determining the location of active users seeking access within a cell of a wireless communications network comprising:
    a grid of energy measuring sensors providing data, said sensors distributed within said cell;
    means for detecting said data;
    means for determining from said data the transmitted energy in a given bandwidth in a given region of said cell;
    a neural net for processing said transmitted energy data, said neural net trained in propagation characteristics of said cell; and
    means for determining the location of the active users seeking access to the wireless communications network from said processed transmitted energy data.

6. A system for determining the location of active users seeking access within a cell of a wireless communications network comprising:
    a grid of energy measuring sensors providing data, said sensors distributed within said cell;
    means for detecting said data;
    means for determining from said data the transmitted energy in a given bandwidth in a given region of said cell;
    means for determining the location of the active users seeking access to the wireless communications network from said transmitted energy in a given bandwidth and said given region of said cell;
    means for grouping said active users seeking access to a wireless communications network by location; and
    means for using said groupings for reducing delay in gaining access to the wireless communications network by said active users seeking access.

7. The system as defined in claim 5 further comprising a random access protocol means for reducing delay in gaining access by the active users seeking access to the wireless communications network.

8. The system as defined in claim 7 wherein said random access protocol means comprises slotted Aloha.

9. The system as defined in claim 8 further comprising means for locating geographically said groupings of active users seeking access by defining subchannels using distinct antenna beams.

10. A system for determining, in a random access protocol within a cell of a wireless communications network, whether a user who has gained access to the wireless communications network was a new or a backlogged user comprising:
    a field of energy measuring sensors for providing data, said sensors distributed substantially within the cell;
    means for receiving said data from the energy measuring sensors, and, from said data, determining a number of users seeking access to the wireless communications network at one or more points in time, and means for determining a footprint for the backlogged user;
    means for determining a footprint of the user who gained access; and
    means for determining if the user who gained access was the backlogged user, responsive to said means for determining a footprint of the user.

11. The system as defined in claim 10 wherein said means for determining if the user who gained access was a backlogged user comprises means for processing the footprint of the user who gained access from the footprint for the backlogged user wherein a negative value at any one of said sensors indicates that the user who gained access was not the backlogged user.

12. A method for stabilizing a random access protocol within a cell of a wireless communications network comprising the steps of:
    providing data from a field of energy measuring sensors, said sensors distributed substantially within the cell;
    receiving said data from the energy measuring sensors;
    determining from said data a number of overlapping users seeking access to the wireless communications network; and
    in response to the determination of the number of overlapping user; reducing delay time before the overlapping users obtain access.

13. The method as defined in claim 12 wherein the step of reducing the delay time comprises using a slotted Aloha random access protocol.

14. The method as defined in claim 12 wherein the step of reducing the delay time before the overlapping users obtain access comprises the step of varying a retransmission delay time in proportion to the number of overlapping users seeking access.

15. The method as defined in claim 12 wherein the step of determining the number of overlapping users seeking access comprises neural net processing of said data.

16. A method for determining a location of active users within a cell of a wireless communications network using energy measuring sensor data from a grid of sensors distributed in the cell comprising the steps of:

providing a set of training data including signal propagation characteristics of the cell;

training a neural net with said training data;

detecting and measuring transmitted energy in a given bandwidth in a given region of said cell; and responsive to said detected and measured transmitted energy, determining with said trained neural net the location of the active users.

17. A method for determining a location of active users within a cell of a wireless communications network using energy measuring sensor data from a grid of sensors distributed in the cell comprising the steps of:

detecting and measuring transmitted energy in a given bandwidth in a given region of said cell;

responsive to said detected and measured transmitted energy, determining the location of the active users;

grouping the active users seeking access to the wireless communications network by location; and responsive to said groupings of the active users, reducing the delay in gaining access to the wireless communications network by said active users.

18. The method as defined in claim 17 further comprising the step of:

reducing delay in gaining access by said active users to the wireless communications network by using a random access protocol.

19. The method as defined in claim 18 wherein said random access protocol comprises implementing slotted Aloha.

20. The method as defined in claim 19 wherein implementing slotted Aloha comprises the step of locating geographically said groupings of the active users by defining subchannels using distinct antenna beams.

21. A method for determining, in a random access protocol within a cell of a wireless communications network, whether a user who has gained access to the communications network was a new or a backlogged user comprising the steps of:

providing data from a field of energy measuring sensors, said sensors distributed substantially within the cell;

receiving said data from the energy measuring sensors, from said data, determining a number of users seeking access at one or more points in time, determining a footprint for the backlogged user;

determining a footprint of the user who gained access; and comparing the footprint for the backlogged user with the footprint of the user who gained access to determine if the user who gained access was the backlogged user.

22. The method as defined in claim 21 wherein said step of comparing comprises the step of processing the footprint of the user who gained access from the footprint for the backlogged user, wherein a negative value at any one of said sensors indicates that the user who gained access was not the backlogged user.

* * * * *